(12) United States Patent
Lee

(10) Patent No.: US 10,169,811 B2
(45) Date of Patent: *Jan. 1, 2019

(54) AUCTION METHOD AND SERVER

(71) Applicant: Jeong Gab Lee, Seoul (KR)

(72) Inventor: Jeong Gab Lee, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/287,758

(22) Filed: Oct. 7, 2016

(65) Prior Publication Data

US 2017/0024812 A1    Jan. 26, 2017

Related U.S. Application Data

(63) Continuation of application No. 13/463,115, filed on May 3, 2012, now abandoned.

(30) Foreign Application Priority Data

Sep. 14, 2011   (KR) .................. 10-2011-0092473

(51) Int. Cl.
    *G06Q 30/08*    (2012.01)
    *G06Q 30/02*    (2012.01)
    *G06Q 20/10*    (2012.01)

(52) U.S. Cl.
    CPC ........... *G06Q 30/08* (2013.01); *G06Q 20/102* (2013.01); *G06Q 30/02* (2013.01)

(58) Field of Classification Search
    CPC ..................................................... G06Q 30/08
    USPC .......................................................... 705/37
    See application file for complete search history.

(56) References Cited

U.S. PATENT DOCUMENTS

| 5,835,896 A * | 11/1998 | Fisher .................. G06Q 30/08 705/37 |
| 6,671,674 B1 | 12/2003 | Anderson et al. |
| 7,428,501 B2 | 9/2008 | Dinwoodie et al. |
| 7,461,022 B1 * | 12/2008 | Churchill ............... G06Q 10/02 705/26.3 |
| 7,620,590 B2 | 11/2009 | Avery |
| 7,702,540 B1 | 4/2010 | Woolston |
| 7,853,484 B2 | 12/2010 | Yang et al. |
| 7,970,652 B1 | 6/2011 | Woolston |
| 8,027,879 B2 | 9/2011 | Ramer et al. |
| 8,086,653 B1 | 12/2011 | Walker et al. |

(Continued)

FOREIGN PATENT DOCUMENTS

| JP | 2005-018267 A | 1/2005 |
| JP | 2005-107952 A | 4/2005 |
| JP | 2007-193746 A | 8/2007 |
| WO | 2010/102350 A1 | 9/2010 |

OTHER PUBLICATIONS http://web.archive.org/web/20101110060244/http://www.newlifeauctions.com/cale.html, Nov. 2010.*

(Continued)

*Primary Examiner* — Alexis M Casey
(74) *Attorney, Agent, or Firm* — Park, Kim & Suh, LLC

(57) ABSTRACT

Provided are an auction method and server that enable a seller and bidders to determine the price of a product at their own discretion by enabling the bidders to participate in a bid between the lowest price offered by the seller and the highest price of the product, and give benefit to both the seller and successful bidders by applying the successful bid price of a lowest successful bidder to all the successful bidders as a sale price.

4 Claims, 6 Drawing Sheets

(56) References Cited

U.S. PATENT DOCUMENTS

| | | |
|---|---|---|
| 2004/0215526 A1 | 10/2004 | Luo et al. |
| 2006/0178977 A1 | 8/2006 | Chapelle et al. |
| 2007/0174171 A1 | 7/2007 | Sheffield |
| 2008/0071634 A1 | 3/2008 | Rampell et al. |
| 2008/0172294 A1* | 7/2008 | McGuire ............ G06Q 30/0226 705/14.27 |
| 2010/0217680 A1* | 8/2010 | Fusz .................. G06Q 30/0283 705/26.1 |
| 2011/0071861 A1 | 3/2011 | Qian et al. |
| 2012/0123893 A1 | 5/2012 | Levin et al. |
| 2012/0130772 A1 | 5/2012 | Hatfield |
| 2012/0143712 A1 | 6/2012 | Echavarria |

OTHER PUBLICATIONS

No Author, "Customer Rebates Paid To Resolve Competition Bureau Concerns About Regular Price." Mondaq Business Briefing, Oct. 2, 2006. Retrieved from Dialog File: 148, Access#: 0021294311 on May 6, 2013.
U.S. Office Action in U.S. Appl. No. 13/450,836 dated Mar. 28, 2013.
U.S. Notice of Allowance in U.S. Appl. No. 13/107,274 dated May 13, 2013.
U.S. Final Office Action in U.S. Appl. No. 13/107,274 dated Mar. 1, 2013.
Nov. 2010—http://web.archive.org/web/20101110060244/http://www.newlifeauctions.com/cale.html.
http://www.env.go.jp/earth/ondanka/det/os-info/mats/rggi20080905.pdf (=$CO_2$ Allowance Action Notice for $CO_2$ Allowance Auction 1 on Sep. 25, 2008).
Institute for Monetary and Economic Studies Bank of Japan, IMES Discussion Paper Series 2009-U-12, Dec. 16, 2009, p. 47-49.
U.S. Office Action in U.S. Appl. No. 13/107,274 dated Jan. 4, 2013.
U.S. Office Action in U.S. Appl. No. 13/502,837 dated Dec. 28, 2012.
European Search Report in Appln. No. 12171718.5 dated Jan. 30, 2013.

* cited by examiner

| BID RANKING | ID | BID PRICE | SALE PRICE | PROFIT |
|---|---|---|---|---|
| FIRST RANK | banana | 690,000 WON | 370,000 WON | 320,000 WON |
| SECOND RANK | apple | 685,000 WON | 370,000 WON | 315,000 WON |
| THIRD RANK | bread | 677,000 WON | 370,000 WON | 307,000 WON |
| FOURTH RANK | coffee | 670,000 WON | 370,000 WON | 300,000 WON |
| ... | ... | ... | ... | ... |
| 99TH RANK | milk | 380,000 WON | 370,000 WON | 10,000 WON |
| 100TH RANK | angel(☆) | 370,000 WON | 370,000 WON | PROVIDE BENEFIT |
| 101ST RANK | black | 366,000 WON | FAIL | X |
| 102ND RANK | blue | 360,000 WON | FAIL | X |
| ... | ... | ... | ... | ... |

| BID RATE | ID | BID PRICE | SALE PRICE | PROFIT |
|---|---|---|---|---|
| 1% | banana | 49,000 WON | 27,000 WON | 22,000 WON |
| 2% | apple | 48,500 WON | 27,000 WON | 21,500 WON |
| 10% | bread | 45,000 WON | 27,000 WON | 18,000 WON |
| 50% | coffee | 30,000 WON | 27,000 WON | 3,000 WON |
| 65% | battle | 28,000 WON | 27,000 WON | 1,000 WON |
| 70% | angel(✡) | 27,000 WON | 27,000 WON | PROVIDE BENEFIT |
| ⋮ | ⋮ | ⋮ | FAIL | X |
| 90% | blue | 23,000 WON | FAIL | X |
| 100% | link | 22,000 WON | FAIL | X |

AUCTION METHOD AND SERVER

CROSS-REFERENCE TO RELATED APPLICATIONS

This application is a continuation of U.S. patent application Ser. No. 13/463,115, filed on May 3, 2012, currently pending, which claims the benefit of Korean Patent Application No. 10-2011-0092473, filed on Sep. 14, 2011, the contents of which are all hereby incorporated by reference herein in their entirety.

BACKGROUND

1. Field of the Invention

The present invention relates to an auction method and server, and more particularly, to an auction method and server that enable a seller and bidders to determine a price at their own discretion and thereby give benefit to both the seller and successful bidders.

2. Discussion of Related Art

In social commerce, products are on sale at approximately half the price for one day, and a deal is made only when the minimum quantity of the products that a company has determined in advance are sold. Social commerce is also referred to as social shopping. In social commerce, consumers voluntarily spread the corresponding information using a social network, service (SNS), such as Twitter or Facebook, to satisfy the minimum number of purchases. In this way, purchasers can have the benefit of a discount, and a seller can have wholesale and promotion effects simultaneously.

Advertisers who make contracts with social commerce companies and sell their products at approximately half the price expect customers to revisit through the promotion effect. However, the expectation is not always satisfied. Due to the overissue of coupons and excessively discounted prices, advertisers become unable to provide customers with service of a predetermined quality or more. Then, coupon customers are treated with discrimination in aspects of quantity, quality, and service in comparison with, general customers, and the advertisers cannot deal well with customers and may close down their shops. As a result, coupon customers frequently have complaints about service, and the corresponding shop frequently suffers a loss because customers do not revisit the shop. This is because, in particular, social commerce companies do not guarantee appropriate prices for products at which advertisers can stably provide customers with service.

Consequently, an auction system that enables a seller (i.e., advertiser) and bidders to determine an appropriate price at their own discretion and thereby give benefit to all of the seller (i.e., advertiser), a bidder and a service company, is required.

SUMMARY OF THE INVENTION

The present invention is directed to an auction method and server that enable a seller and bidders to determine the price of a product at their own discretion by enabling the bidders to participate in a bid between the lowest price offered by the seller and the highest price of the product, and give benefit to both the seller and successful bidders by applying the successful bid price of a lowest successful bidder to all the successful bidders as a sale price.

According to an aspect of the present invention, there is provided an auction method, including: maintaining, at an auction server, a database of a highest price of a specific product, a lowest price offered by a seller, a maximum number of bidders of bidders, and a limited number of successful bidding products; receiving, at the auction server, bidding information including bid prices for the specific product between the lowest price and the highest price from bidders; selecting, at the auction server, a lowest successful bidder from among the bidders in consideration of the limited number of successful bidding products and the bidding information when the number of bidders becomes the maximum number of bidders; and requesting, at the auction server, payment from all successful bidders using a successful bid price of the lowest successful bidder as a sale price on the basis of bidding information about the lowest successful bidder.

According to another aspect of the present invention, there is provided an auction server, including: a storage configured to maintain a database of a highest price of a specific product, a lowest price offered by a seller, a maximum number of bidders of bidders, and a limited number of successful bidding products; a receiver configured to receive bidding information including bid prices for the specific product between the lowest price and the highest price from bidders; a selector configured to select a lowest successful bidder from among the bidders in consideration of the limited number of successful bidding products and the bidding information when the number of bidders becomes the maximum number of bidders;

a payment requester configured to request payment from all successful bidders using a successful bid price of the lowest successful bidder as a sale price on the basis of bidding information about the lowest successful bidder; and a controller configured to control the storage, the receiver, the selector, and the payment requester.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the scope of the invention.

FIG. 1 is a diagram for describing an auction system related to an exemplary embodiment of the present invention.

Figure 1:
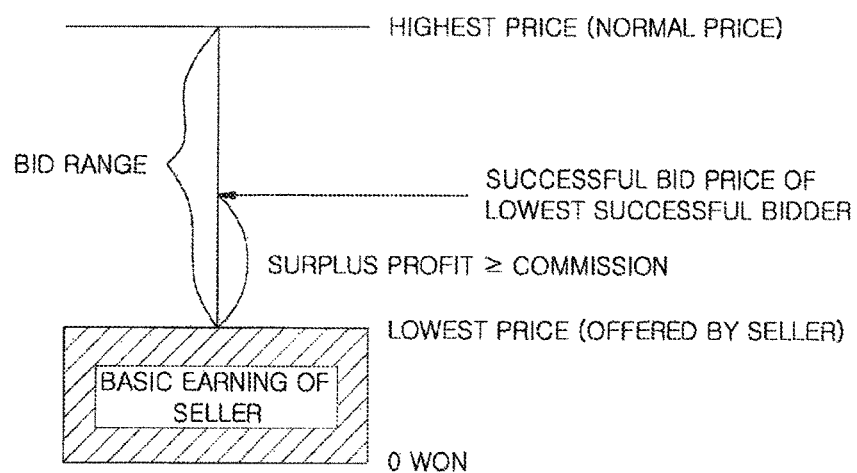
FIG. 1 is a diagram for describing, an auction system according to an exemplary embodiment of the present invention.

As illustrated in FIG. 1, in an auction system according to an exemplary embodiment of the present invention, a seller can offer the lowest price of a product to sell. Throughout the specification, the lowest price denotes the minimum price at which the seller can guarantee stable service (i.e., stable quantity and quality of a product) for his/her product.

In an exemplary embodiment of the present invention, bidders participate in a bid between the highest price and the lowest price of the specific product. Throughout the specification, the highest price denotes the maximum price at which a bid for a specific product can be made. The highest price may include a normal price of the specific product. Also, the highest price may be a price calculated by discounting the normal price of the specific product by a predetermined rate. The highest price can be determined by an auction server or the seller.

In an exemplary embodiment of the present invention, a lowest successful bidder satisfying a specific auction condition can be selected from among the bidders. Throughout the specification, the lowest successful bidder denotes a successful bidder who has made a successful bid at the lowest bid price among a plurality of successful bidders satisfying the specific auction condition. For example, assuming that there are 50 successful bidders, when the highest bid price is 500 thousand won and the lowest bid price is 300 thousand won among bid prices offered by the successful bidders, a successful bidder who has made a successful bid at a bid price of 300 thousand won is the lowest successful bidder.

In an exemplary embodiment of the present invention, the lowest successful bidder may be one person, or may be a plurality of persons when many persons have offered the same bid price.

In an exemplary embodiment of the present invention, the successful bid price of the lowest successful bidder may be applied to all successful bidders as a sale price. In other words, the successful bidders can purchase the product at a lower price than their bid prices.

An amount calculated by subtracting the lowest price from the successful bid price (i.e., the sale price) of the lowest successful bidder may be a surplus profit. Since a seller can stably provide his/her service as long as the lowest price is guaranteed, a surplus profit is obtained when a sale price is set to be higher than the lowest price. In this case, all or a part of the surplus profit may be an auction commission according to an exemplary embodiment of the present invention. In other words, in an exemplary embodiment of the present invention, sellers do not need to additionally pay an auction commission at their lowest prices. Thus, the sellers are ensured to have as much basic earning as the lowest price, and can provide stable service to customers.

Hereinafter, auction server and method which may give benefit to both the seller and successful bidders will not be described in further detail with reference to FIGS. 2 and 3.

Figure 2:
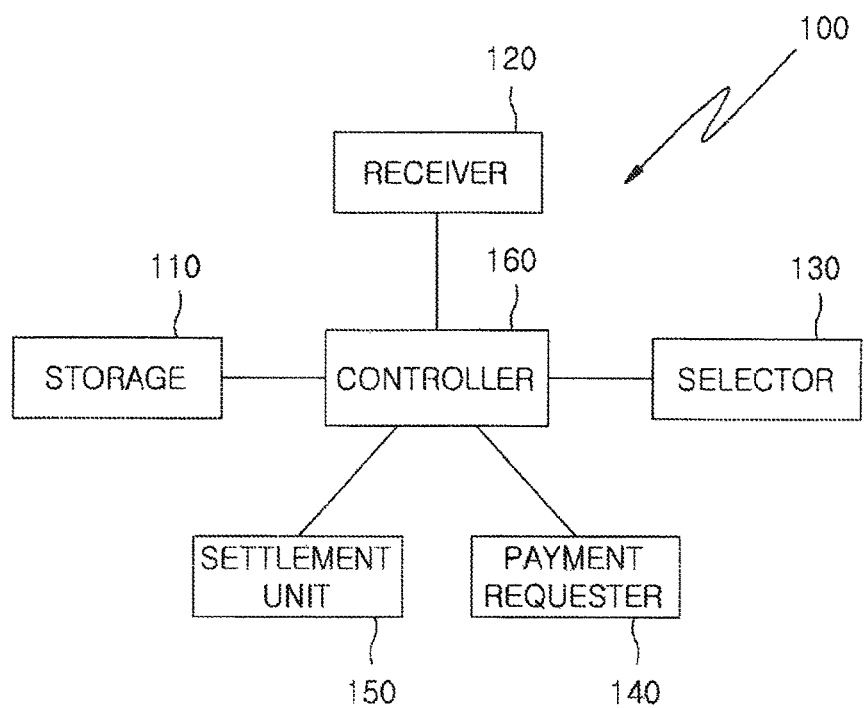
FIG. 2 is a block diagram of an auction server according to an exemplary embodiment of the present invention.

FIG. 2 is a block diagram of an auction server according to an exemplary embodiment of the present invention.

As shown in FIG. 2, an auction server 100 may include a storage 110, a receiver 120, a selector 130, a payment requester 140, a settlement unit 150, and a controller 160. However, all the shown components are not essential components. The auction server 100 may be implemented by a larger or smaller number of components than the shown components.

The storage 110 may maintain a database of the highest price of a specific product, the lowest price offered by a seller, and other auction conditions. According to a first exemplary embodiment of the present invention, the auction conditions may include the limited number of successful products and the limited number of successful bidders. Throughout the specification, the limited number of successful bidders denotes the limited number of persons who can be successful bidders among bidders. For example, when the limited number of successful bidders is 50, only 50 persons can be successful bidders even when there are 100 bidders. Also, throughout the specification, the limited number of successful bidding products denotes the limited number of products that can be successful bidding products among bidding products. For example, when the limited number of successful bidding products is 50, only 50 products can be successful bidding products regardless of a number of bidders.

According to a second exemplary embodiment of the present invention, the auction conditions may include a successful bid rate. Throughout the specification, the successful bid rate denotes a ratio of the number of persons who can be successful bidders to all bidders. For example, when a successful bid rate is 50% and the total number of bidders is 100, only 50 bidders, that is, 50% of the 100 bidders, can be successful bidders.

According to a third exemplary embodiment of the present invention, the auction conditions may include the maximum number of bidders, the limited number of successful bidding products and the limited number of successful bidders. Throughout the specification, the maximum number of bidders denotes the maximum number of persons who can participate in a bid. For example, when the maximum number of bidders is 100 and the number of bidders becomes 100, no more persons can participate in the bid, and the auction is closed.

In an exemplary embodiment of the present invention, the receiver 120 receives bidding information including bid prices from bidders. The bidding information may include the bid prices, the quantity of the product, bidder information, product information, and so on. The bidders may offer bid prices between the lowest price offered by the seller and the highest price of the specific product. In an exemplary embodiment of the present invention, the bidders may access the auction server 100 using their terminals and thereby offer their bid prices.

In an exemplary embodiment of the present invention, the selector 130 may select a lowest successful bidder among the bidders. The selector 130 may select the lowest successful bidder when a predetermined bidding time elapses, or may finish the auction and select the lowest successful bidder when the number of bidders becomes the maximum number of bidders.

In an exemplary embodiment of the present invention, the selector 130 may select the lowest successful bidder in consideration of the limited number of successful bidders (or the limited number of successful, bidding products) and the bidding information. Also, in another exemplary embodiment of the present invention, the selector 130 may select the lowest successful bidder among the bidders in consideration of the successful bid rate and the bidding information.

Meanwhile, when a plurality of successful bidders have offered the same bid price, the selector 130 may select the lowest successful bidder in further consideration of bidding time in an exemplary embodiment of the present invention. In other words, when a plurality of successful bidders have offered the lowest bid price, the selector 130 may select the lowest successful bidder on a first-come-first-serve basis. In this case, the lowest successful bidder may be one or more persons.

In an exemplary embodiment of the present invention, the payment requester 140 may request payment from all successful bidders using the successful bid price of the lowest successful bidder as a sale price, on the basis of bidding information about the lowest successful bidder. In this case, the payment requester 140 may make a payment request to terminals of the successful bidders. The terminals may be implemented in various forms. The terminals may be mobile terminals as well as fixed terminals. For example, the terminals may be a computer, laptop, tablet personal computer (PC), cellular phone, smartphone, personal digital assistant (PDA), portable multimedia player (PMP), navigator, e-book terminal, and so on.

Meanwhile, when the successful bidders have paid their bid prices, the payment requester 140 may settle amounts, calculated by subtracting the successful bid price of the lowest successful bidder from the previously paid bid prices.

In an exemplary embodiment of the present invention, the settlement unit 150 may settle an auction commission for the seller on the basis of an amount calculated by subtracting the lowest price from the successful bid price of the lowest successful bidder. The auction commission denotes a predetermined commission that the seller needs to pay the auction server 100 (or an auction server management company) when the seller puts his/her product for auction through the auction server 100. The auction commission may be an advertising fee. In an exemplary embodiment of the present invention, the auction commission may be all or a part of the amount calculated by subtracting the lowest price from the successful bid price, (i.e., a common sale price) of the lowest successful bidder.

The controller 160 controls the storage 110, the receiver 120, the selector 130, the payment requester 140, and the settlement unit 150 overall. Also, the controller 160 may provide a predetermined benefit to the lowest successful bidder. The predetermined benefit may be a free product, reserved points, a discount, an award (e.g., a specific cyber status), and so on.

In an exemplary embodiment of the present invention, the controller 160 may provide the successful bidders with information about profits calculated by subtracting the sale price from the bid prices of the successful bidders. The profit information may include information about profits that the successful bidders substantially obtain with respect to their bid prices when the successful bid price of the lowest successful bidder is applied to all the successful bidders as the sale price.

Meanwhile, the controller 160 may provide bidders with information, such as an average bid price, bid rankings, and the total number of bidders, in real time. When a bidder becomes the lowest successful bidder, the bidder can be provided with the predetermined benefit. Also, a bidder needs to satisfy a predetermined auction condition to be a successful bidder. Thus, the information about the average bid price, the bid rankings, the total number of bidders, etc. may be very useful to bidders.

The controller 160 may provide the information about the average bid price, the bid rankings, and the total number of bidders to a specific bidder only. The specific bidder may be a paid member who has purchased an item, etc.

Meanwhile, when a bidder offers a bid price out of the range between the lowest price and the highest price, the controller 160 may automatically exclude the bidder in an exemplary embodiment of the present invention. In another exemplary embodiment of the present invention, the controller 160 may control bid prices out of the range between the lowest price and the highest price not to be input.

An auction method that gives benefit to both a seller and successful bidders using the constitution of the auction server 100 will be described in detail below with reference to FIG. 3.

Figure 3:
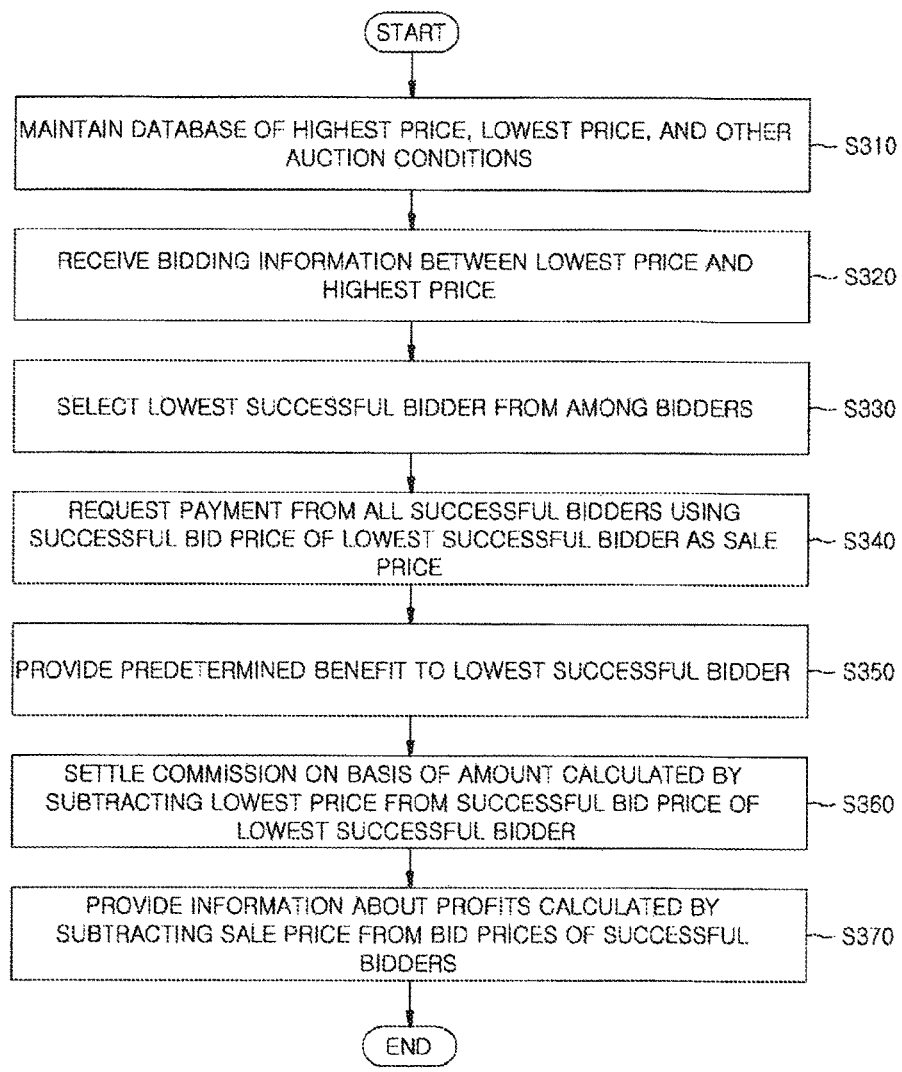
FIG. 3 is a flowchart illustrating an auction method according to an exemplary embodiment of the present invention.

FIG. 3 is a flowchart illustrating an auction method related to an exemplary embodiment of the present invention.

As illustrated in FIG. 3, in an exemplary embodiment of the present invention, the auction server 100 may maintain a database of the highest price of a specific product, the lowest price offered by a seller, and other auction conditions (S310). The auction conditions may include the limited number of successful bidders, the limited number of successful bidding products, a successful bid rate, the maximum number of bidders, and so on.

The specific product is a product put up for auction, including an intangible product as well as a tangible product. For example, the specific, product may be a group-purchasing product sold at a social commerce site, a keyword used for search advertising, a service product such as massage and skin care, and so on.

In an exemplary embodiment of the present invention, the auction server 100 may receive bidding information including bid prices of the specific product between the lowest price and the highest price from bidders (S320). In other words, the bidders offer bid prices that they want in consideration of the lowest price, the highest price, and the other auction conditions (e.g., the limited number of successful bidders, the limited number of successful bidding products, the successful, bid rate, the maximum number of bidders, etc.).

In an exemplary embodiment of the present invention, the auction server 100 may select a lowest successful bidder among the bidders (S330). The lowest successful bidder may be selected in various ways. In the first exemplary embodiment of the present invention, when a predetermined bidding time elapses, the auction server 100 may select the lowest successful bidder from among the bidders in consideration of the limited number of successful bidders (or the limited number of successful bidding products) and the bidding information. For example, when the limited number of successful bidders is 500 and 700 persons have participated in the bid during the predetermined bidding time, 500 bidders can be successful bidders in decreasing order of bid price. At this time, the auction server 100 may select a $500^{th}$ successful bidder as the lowest successful bidder.

In the second exemplary embodiment of the present invention, when the predetermined bidding time elapses, the auction server 100 may select the lowest successful bidder in consideration of the successful bid rate and the bidding information. For example, when the successful bid rate is 60% and 1000 persons have participated in the bid during the predetermined bidding time, 600 bidders (1000 persons× 0.6) can be successful bidders in decreasing order of bid price. At this time, the auction server 100 may select a $600^{th}$ successful bidder as the lowest successful bidder.

In the third exemplary embodiment of the present invention, when the number of bidders becomes the maximum number of bidders, the auction server 100 may end the bidding and select the lowest successful bidder from among the bidders in consideration of the limited number of successful bidders (or the limited number of successful bidding products) and the bidding information. For example, when the maximum number of bidders is 1000 and the number of bidders becomes 1000, the auction server 100 may end the bidding and select the lowest successful bidder. When the limited number of successful bidders is 600, 600 bidders can be successful bidders in decreasing order of bid price at the point in time when the bidding ends. At this time, the auction server 100 may select a 600$^{th}$ successful bidder as the lowest successful bidder.

In an exemplary embodiment of the present invention, the auction server 100 may request payment from all successful bidders using the successful bid price of the lowest successful bidder as a sale price on the basis of bidding information about the lowest successful bidder (S340). In other words, the lowest successful bid price can be applied to the plurality of successful bidders as a common sale price. Thus, in an exemplary embodiment of the present invention, the successful bidders can purchase the product at a lower price than those that they have proposed during the bidding.

Meanwhile, when the successful bidders have previously paid their bid prices, the auction server 100 may settle amounts calculated, by subtracting the successful bid price of the lowest successful bidder from the previously paid bid prices.

In an exemplary embodiment of the present invention, the successful bid price of the lowest successful bidder is determined by bid prices of the bidders, the limited number of successful bidders, the limited number of successful bidding products, the successful bid rate, etc., and thus can aid the seller and the bidders in forming the sale price of the product.

Unlike a general auction having only one successful bidder, there can be a plurality of successful bidders in an exemplary embodiment of the present invention. Thus, many persons can benefit from their successful bids.

In an exemplary embodiment of the present invention, the auction server 100 may provide a predetermined benefit to the lowest successful bidder (S350). For example, the auction server 100 may request payment from a bidder selected as the lowest successful bidder at a sale price of 0 won. Also, the auction server 100 may accumulate specific points for the lowest successful bidder to participate in a bid. Alternatively, the auction server 100 may request payment from the lowest successful bidder at a price calculated by discounting the successful bid price of the lowest successful bidder by a predetermined rate. For example, when the successful bid price of the lowest successful bidder is 50 thousand won, the auction server 100 may request payment from the lowest successful bidder at a sale price of 25 thousand won discounted by 50% while requesting payment from other successful bidders at a sale price of 50 thousand won.

Consequently, to obtain such a benefit, bidders may offer bid prices in consideration of a bid price whereby they can be selected as the lowest successful bidder during the bidding in an exemplary embodiment of the present invention, so that the bidders' interest can be piqued.

Meanwhile, in an exemplary embodiment of the present invention, several persons may have offered the lowest bid price among successful bidders. In this case, in an exemplary embodiment of the present invention, the auction server 100 may select a lowest successful, bidder who can obtain the predetermined benefit on a first-come-first-serve basis. For example, when 500 bidders become successful bidders, 10 of the successful bidders may have offered the lowest successful bid price of 30 thousand won. At this time, the auction server 100 may select the lowest, successful bidder in further consideration of bidding time (i.e., on the first-come-first-serve basis). When A has participated in the bid first among the 10 successful bidders who have offered the lowest successful bid price of 30 thousand won, the auction server 100 may provide the predetermined benefit to A. Also, the auction server 100 may request payment from the other nine persons at a sale price of 30 thousand won without a specific benefit.

In an exemplary embodiment of the present; invention, lowest successful bidders who can obtain the benefit may be limited to a specific number. For example, when the number of lowest successful bidders is limited to three, the auction server 100 may select three persons as the lowest successful bidders from among successful bidders who have offered the lowest bid price on the first-come-first-serve basis and provide the predetermined benefit to the three lowest successful bidders.

In an exemplary embodiment of the present invention, the auction server 100 may settle an auction commission for the seller on the basis of an amount calculated by subtracting the lowest price from the successful bid price (i.e., the sale price) of the lowest successful bidder (S360). For example, when the highest price of the specific product is 50 thousand won, the lowest price offered by the seller is 20 thousand won, and the successful bid price of the lowest successful bidder is 25 thousand won, the auction server 100 may settle the auction commission on the basis of 5 thousand won calculated by subtracting the lowest price of 20 thousand won from the successful bid price of 25 thousand won of the lowest successful bidder.

Here, the auction server 100 may settle all or only a part of the amount calculated by subtracting the lowest price from the successful bid price (i.e., the sale price) of the lowest successful bidder as the auction commission. When there are 500 successful bidders, the auction server 100 may settle all of 2.5 million won (500×5 thousand won) as the auction commission. Alternatively, the auction server 100 may settle 80% of the 2.5 million won (2 million won) as the auction commission and give 20% (500 thousand won) back to the seller.

Thus, in an exemplary embodiment of the present invention, the seller may determine the lowest price without considering the auction commission, etc. In other words, the seller only considers whether quality of the specific product can be guaranteed by the lowest price, and thus can provide a stable service to successful bidders. Thus, the seller can receive a favorable evaluation of the product from the successful bidders, and may also be able to induce repurchasing and revisiting of the successful bidders. Meanwhile, the successful bidders can also be ensured to have the product of good quality, and it is possible, to prevent bad situations. As a result, the reliability of the seller and the auction server 100 can be improved in an exemplary embodiment of the present invention.

Also, in an exemplary embodiment of the present invention, the lowest price does not include the auction commission, and the seller can offer a relatively low price as the lowest price. Thus, bidders can participate in the bid with relatively low prices, and successful bidders also can purchase the product of good quality at a relatively low price.

In an exemplary embodiment of the present invention, the auction server 100 may provide information about profits obtained by subtracting the sale price from the bid prices of the successful bidders to the successful bidders (S370). Since the successful bid price of the lowest successful bidder becomes the sale price, the sale price is generally lower than the bid prices of the successful bidders. Thus, the auction server 100 provides information about differences between the bid prices and the sale price for which payment requests are made to the successful bidders, thereby increasing advertising effects on the seller and the auction server 100.

Figure 4:
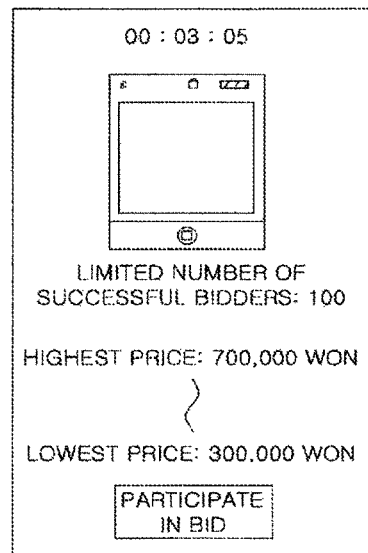
FIG. 4 illustrates a first exemplary embodiment of the present invention.

FIG. 4 illustrates the first exemplary embodiment of the present invention.

As illustrated in FIG. 4, in an exemplary embodiment of the present invention, a seller may want to sell cellular phones by auction. Here, the seller may offer the limited number of successful bidders (or the limited number of successful bidding products) and the lowest price in consideration of quality of the product, the capability of supplying the product, and so on. When the seller sets the limited number of successful bidders to 100 and offers the lowest price of 300 thousand won for a cellular phone whose highest price is 700 thousand won, bidders participate in the bid between the lowest price of 300 thousand won and the highest price of 700 thousand won. Also, the seller may set the limited number of successful bidding products to 100 instead of the limited number of successful bidders.

When a predetermined bidding time elapses, the auction server 100 selects a lowest successful bidder on the basis of the limited number of successful bidders (or the limited number of successful bidding products) and bidding information. Since the limited number of successful bidders is 100 (or since the limited number of successful bidding products is 100), the auction server 100 selects 100 successful bidders (or 100 successful bidding products) in decreasing order of bid price. Then, the auction server 100 selects a successful bidder (ID: angel) who has offered the lowest bid price among the 100 successful bidders (or the 100 successful bidding products) as the lowest successful bidder, and determines 370 thousand won which is the successful bid price of the lowest successful bidder (ID: angel) as a sale price for all the successful bidders. Thus, the successful bidders can purchase the cellular phones at the lower price than their bid prices.

Meanwhile, the auction server 100 may further provide an additional benefit to the lowest successful bidder. For example, the lowest successful, bidder (ID: angel) is enabled to purchase the cellular phone for free or at a discount price of 200 thousand won, or obtains reserved points.

Thus, while participating in the bid, each bidder may consider a bid price whereby he/she can be one of the successful bidders and the lowest successful bidder, so that the bidders' interest can be piqued.

Meanwhile, the auction server 100 may provide profit information to the successful bidders. For example, a successful bidder (ID: banana) who has offered the highest bid price earns a profit of 320 thousand won because the sale price is 370 thousand won while his/her bid price is 690 thousand won. Thus, the auction server 100 may provide profit information such as "Cellular phone A: You have successfully bid at 370 thousand won. The profit is 320 thousand won. Do you want to make a payment?" to the terminal of the successful bidder (ID: banana).

In the first exemplary embodiment of the present invention, the $101^{st}$ and following bidders exceeding the limited number of successful bidders of 100 (or the limited number of successful bidding products of 100) have not become the successful bidders and cannot purchase the cellular phone.

Meanwhile, in the first exemplary embodiment of the present invention, the auction server 100 may provide information about a bidding time in which a bid can be made (e.g., 00:03:05) to the bidders.

Also, the auction server 100 settles an auction commission for the seller on the basis of an amount calculated by subtracting the lowest price of 300 thousand won offered by the seller from the successful bid price of 370 thousand won of the lowest successful bidder {100 persons×(370 thousand won−300 thousand won)=7 million won}.

Meanwhile, when the number of bidders does not become the limited number of successful bidders (or the limited number of successful bidding products) during the predetermined bidding time, all the bidders may become successful bidders in an exemplary embodiment of the present invention, or the auction may be cancelled and there may be no successful bidder in another exemplary embodiment of the present invention.

Figure 5:
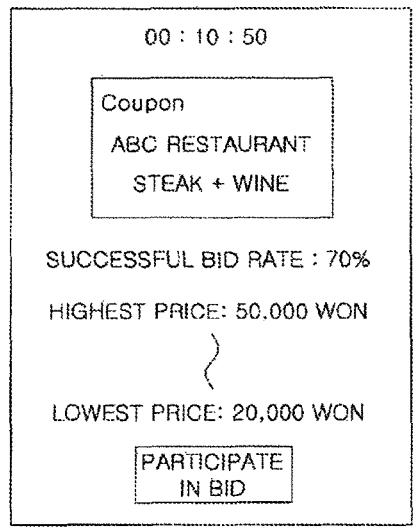
FIG. 5 illustrates a second exemplary embodiment of the present invention.

FIG. 5 illustrates the second exemplary embodiment of the present invention.

As illustrated in FIG. 5, the auction method may also be used in social commerce, etc. according to an exemplary embodiment of the present invention. For example, ABC restaurant, that is, a seller, may sell steaks and wine through a social commerce site in a group purchasing scheme. Here, the seller may offer a successful bid rate and the lowest price in consideration of quality of the product, the capability of supplying the product, and so on. When the seller sets a successful bid rate to 70% and offers the lowest price of 20 thousand won for a steak and wine whose highest price is 50 thousand won, bidders participate in the bid between the lowest price of 20 thousand won and the highest price of 50 thousand won.

In other words, while a social commerce company offers a specific sale price and purchasers merely determine whether or not to purchase the corresponding product in general social commerce, the seller and purchasers directly contribute to forming of the sale price of the product in an exemplary embodiment of the present invention. Thus, in an exemplary embodiment of the present inventions a price satisfying both a seller and purchasers can be formed while quality of the corresponding product is guaranteed.

When a predetermined bidding time elapses, the auction server 100 selects a lowest successful bidder on the basis of the successful bid rate and bidding information. Since the successful bid rate is 70%, 70% of bidders having participated in the bid can be successful bidders in decreasing order of bid price. At this time, the auction server 100 may select a successful bidder (ID: angel) corresponding to 70% as the lowest successful bidder, and determine 27 thousand won, which is the successful bid price of the lowest successful bidder (ID: angel), as a sale price for all the successful bidders. Thus, the successful bidders can purchase a coupon (i.e., the steak and wine) at the lower price than their bid prices.

Meanwhile, the auction server 100 may further provide an additional benefit to the lowest successful bidder. For example, the lowest successful bidder (ID: angel) is enabled to purchase the coupon for free or at a discount price of 10 thousand won, or obtains reserved points.

Meanwhile, the auction server 100 may provide profit information, to the successful bidders. For example, a successful bidder (ID: banana) who has offered the highest bid price earns a profit of 22 thousand won because the sale price is 27 thousand won while his/her bid price is 49 thousand won. Thus, the auction server 100 may provide profit information such as "ABC restaurant coupon (steak+ wine): Auctioned off at 27 thousand won!!/Profit 22 thousand won/Do you want to make a payment?" to the terminal of the successful bidder (ID: banana).

In the second exemplary embodiment of the present invention, 30% of the bidders exceeding the successful bid rate of 70% have not become successful bidders and cannot purchase the coupon. Meanwhile, in the first exemplary embodiment of the present invention, the auction server 100 may provide information about bidding time in which a bid can be made (e.g., 00:10:50) to the bidders.

Also, the auction server 100 settles an auction commission for the seller on the basis of an amount calculated by subtracting the lowest price of 20 thousand won offered by the seller from the successful bid price of 27 thousand won of the lowest successful bidder. At this time, in an exemplary embodiment of the present invention, the auction-server 100 may settle only a portion of the amount calculated by subtracting the lowest price from the successful bid price of the lowest successful bidder as the auction commission and give the rest of the amount back to ABC restaurant. In this case, ABC restaurant may take the rest of the amount in addition to the 20 thousand won at which a stable, service can be basically provided to the successful bidders and provides the corresponding service, so that quality of the product (service) can be improved.

Figure 6:
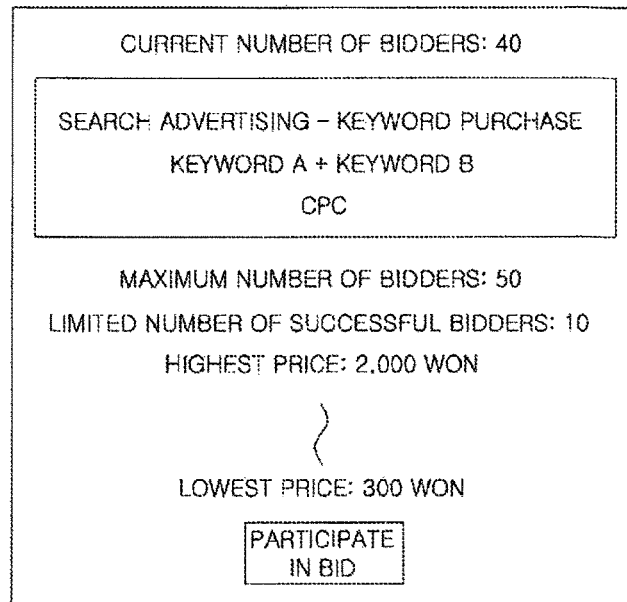
FIG. 6 illustrates a third exemplary embodiment of the present invention.

FIG. 6 illustrates the third exemplary embodiment of the present invention.

As illustrated in FIG. 6, the auction method may also be used in advertising bidding, etc. according to an exemplary embodiment of the present invention. For example, a search advertising provider (e.g., a portal site) may sell a specific keyword by tender. Here, the search advertising provider may offer the limited number of successful bidders (or the limited number of successful bidding products) and the lowest price in consideration of quality of service, the number of advertisements that can be provided per keyword, and so on. For example, in the case of a keyword advertisement provided on a cost per click (CPC; a scheme in which an advertiser pays for his/her advertisement only when a user clicks the advertisement and is directed to a website of the advertiser) basis, when the seller sets the limited number of successful bidders to 10 (or the seller may set the limited number of successful bidding products to 10) and offers the lowest price of 300 won for keyword A and keyword B whose highest price is 2 thousand won, bidders participate in the bid between the lowest price of 300 won and the highest price of 2 thousand won.

In the third exemplary embodiment of the present invention, the maximum number of bidders may be set by at least one of the seller and the auction server 100. When the number of bidders becomes the maximum number of bidders, the bidding ends. For example, when the maximum number of bidders is 50 and the number of bidders becomes 50, the bidding ends and no more persons can participate in the bid.

In the third exemplary embodiment of the present invention, when the number of bidders becomes 50, the auction server 100 selects a lowest successful bidder on the basis of the limited number of successful bidders (or the limited number of successful bidding products) and bidding information. Since the limited number of successful bidders is 10 (or since the limited number of successful bidding products is 10), the auction server 100 selects 10 bidders as successful bidders (or 10 bidding products as successful bidding products) in decreasing order of bid price. The auction server 100 selects a successful bidder (ID: angel) who has offered the lowest bid price among the 10 successful bidders (or the 10 successful bidding products) as the lowest successful bidder, and determines 500 won, which is the successful bid price of the lowest successful bidder (ID: angel), as a sale price for all the successful bidders. Thus, the successful bidders can perform keyword advertising at a lower price than their bid prices.

Meanwhile, the auction server 100 may further provide an additional benefit to the lowest successful bidder. For example, the lowest successful bidder (ID: angel) is enabled to purchase the keywords for free, perform keyword advertising at a discount price of 200 won, or obtain reserved points.

Meanwhile, the auction server 100 may provide profit information to the successful bidders. For example, a successful bidder (ID: banana) who has offered the highest bid price earns a profit of 1300 won per click because the sale price is 500 won while his/her bid price is 1800 won. Thus, the auction server 100 may provide profit information such as "keyword A+keyword B: Auctioned off at 500 won/Profit 1300 won/Make payment?" to the terminal of the successful bidder (ID: banana).

In the third exemplary embodiment of the present invention, the auction server 100 may provide information about the current number of bidders (e.g., Current number of bidders: 40) to the bidders. This is to aid a bidder in recognizing a bid status and participating in the bid at an appropriate timing because the bidding may end when the number of bidders becomes the maximum number of bidders.

Also, the auction server 100 settles an auction commission for the seller on the basis of an amount calculated by subtracting the lowest price of 300 won offered by the seller from the successful bid price of 500 won of the lowest successful bidder. Meanwhile, in an exemplary embodiment of the present invention, the auction server 100 may provide information about bid prices according to bid rankings, an average bid price, the number of bidders, etc. to a paid member who has purchased an item, etc.

The above-described method according to an exemplary embodiment of the present invention can also be embodied as computer-readable codes on a computer-readable recording medium. The computer-readable recording medium includes all kinds of recording devices configured to store data which can be read by computer systems. Examples of computer-readable recording media include a read-only memory (ROM), random-access memory (RAM), compact disc (CD)-ROM, magnetic tape, floppy disk, optical data storage, etc. and also include an implementation in carrier waves (e.g., transmission over the Internet).

In an exemplary embodiment of the present invention, a seller is enabled to offer the lowest price of a product, so that service for the product can be guaranteed.

Also, in an exemplary embodiment of the present invention, bidders can participate in a bid between the lowest price offered by a seller and the highest price of a product, and thus can purchase the product at a lower price than the highest price.

Meanwhile, in an exemplary embodiment of the present invention, a lowest successful bidder is selected from among bidders according to an auction condition, and the successful bid price of the lowest successful bidder is applied to all successful bidders as a sale price. Thus, the successful bidders can purchase the product at a lower price than their bid prices, and it is possible to pique customers' interest. Also, since there is not one successful bidder but a plurality of successful bidders, many bidders benefit from a discount.

It will be apparent to those skilled in the art that various modifications can be made to the above-described exemplary embodiments of the present invention without departing from the scope of the invention. Thus, it is intended that the present invention covers all such modifications provided they come within the scope of the appended claims and their equivalents.

What is claimed is:

1. An auction method, comprising:
providing, by a processor, an upper limit of a bidding price range, a lower limit of the bidding price range, a maximum number of bidders, and a number of available products to terminals of bidders in real time over a network to be displayed on the terminals of the bidders in real time;
receiving, by the processor, bidding prices for each product from the terminals of the bidders over the network, the bidding prices being within the bidding price range;
determining, by the processor, a current number of bidders based on the received bidding prices from the terminals of the bidders in real time;
providing, by the processor, bidding information to the terminals of the bidders in real time over the network to display the bidding information on the terminals of the bidders in real time, wherein the bidding information includes bidding rankings of the bidders, an average bid price, and the current number of the bidders;
terminating, by the processor, bidding when the current number of bidders is equal to the maximum number of bidders;
selecting, by the processor, a group of winning bidders, wherein the winning bidders are selected in descending order of the received bidding prices and a total number of products bid by the winning bidders is equal to the number of available products;
applying, by the processor, a lowest bidding price among bidding prices of the winning bidders as a winning bid price to all of the winning bidders;
receiving, by the processor, payment from the winning bidders at the winning bid price;
making payment, by the processor, to the seller at the lower limit of the bidding range regardless of the winning bid price; and
providing, by the processor, each winning bidder with savings information calculated by subtracting the lowest bidding price from a bidding price of each winning bidder.

2. The auction method of claim 1, further comprising:
providing, by the processor, a predetermined benefit to one or more winning bidders with the lowest bidding price.

3. An auction server, comprising:
a storage configured to maintain a database of an upper limit of a bidding price range, a lower limit of the bidding price range, a maximum number of bidders, and a number of available products, the lower limit of the bidding price range being offered by a seller;
a receiver configured to receive bidding prices for each product from terminals of bidders over a network, the bidding prices being within the bidding price range;
a selector configured to select a group of winning bidders after termination of bidding, wherein the winning bidders are selected in descending order of the received bidding prices and a total number of products bid by the winning bidders is equal to the number of available products, wherein bidding is terminated when a current number of bidders is equal to the maximum number of bidders;
a payment processor configured to apply a lowest bidding price among bidding prices of the winning bidders as a winning bid price to all of the winning bidders, to request payment from the winning bidders at the winning bid price, and to make payment to the seller at the lower limit of the bidding price range regardless of the winning bid price; and
a controller configured to control the storage, the receiver, the selector, and the payment processor, wherein the controller is further configured to provide the upper and lower limits of the bidding price range, the maximum number of bidders, and the number of available products to the terminals of the bidder in real time over the network to be displayed on the terminals of the bidders in real time,
wherein the controller is further configured to determine the current number of bidders based on the received bidding prices from the terminals of the bidders in real time,
wherein the controller is further configured to provide bidding information to the terminals of the bidders in real time over the network to display the bidding information on the terminals of the bidders in real time, wherein the bidding information includes bidding rankings of the bidders, an average bid price, and the current number of the bidders, and
wherein the controller is further configured to provide each winning bidder with savings information calculated by subtracting the lowest bidding price from a bidding price of each winning bidder.

4. The auction server of claim 3, wherein the controller provides a predetermined benefit to one or more winning bidders with the lowest bidding price.

* * * * *